United States Patent [19]
Okuyama et al.

[11] Patent Number: 5,175,930
[45] Date of Patent: Jan. 5, 1993

[54] METHOD AND APPARATUS FOR ATTACHING BELT-SHAPED MEMBER TO FORMING DRUM

[75] Inventors: Koji Okuyama, Kawagoe; Jun Nagano, Tokorozawa; Takashi Ishiwatari, Tokyo, all of Japan

[73] Assignee: Bridgestone Corporation, Tokyo, Japan

[21] Appl. No.: 803,963

[22] Filed: Dec. 9, 1991

[30] Foreign Application Priority Data

Dec. 7, 1990 [JP] Japan ................. 2-407337

[51] Int. Cl.⁵ .................................... B23Q 17/00
[52] U.S. Cl. ................................... 29/894.2; 29/407;
29/701; 29/714; 29/820; 29/235; 156/403;
156/408; 156/410; 156/413; 156/415; 156/422
[58] Field of Search ............. 29/894.2, 894.37, 407,
29/450, 701, 702, 714, 717, 819, 820, 235;
156/126, 127, 128.1, 128.6, 129, 130.3, 130.7,
133-136, 398-403, 408-422

[56] References Cited

U.S. PATENT DOCUMENTS

| | | | |
|---|---|---|---|
| 3,867,231 | 2/1975 | Casey | 156/398 X |
| 3,883,387 | 5/1975 | Csatlos | 156/401 X |
| 4,007,081 | 2/1977 | Mallory | 156/407 |
| 4,105,487 | 8/1978 | Suzuki et al. | 156/126 X |
| 4,128,450 | 12/1978 | Cantorutti | 156/417 |
| 4,314,864 | 2/1982 | Loeffler et al. | 156/126 X |
| 4,430,143 | 2/1984 | Aihara | 156/403 |
| 4,470,867 | 9/1984 | Caretta et al. | 156/401 X |
| 4,473,427 | 9/1984 | Irie | 156/419 X |
| 4,581,084 | 4/1986 | Mukae et al. | 156/403 X |
| 4,627,884 | 12/1986 | Araki | 156/403 X |
| 4,747,904 | 5/1988 | Okuyama et al. | |

FOREIGN PATENT DOCUMENTS 3166149 7/1991 Japan .

*Primary Examiner*—Timothy V. Eley
*Attorney, Agent, or Firm*—Sughrue, Mion, Zinn, Macpeak & Seas

[57] ABSTRACT

The front end and rear end of a belt-shaped member having a predetermined length are grasped by front end grasping pawls and rear end grasping pawls, respectively, movable in synchronism with and independently from each other when required. The front and rear end grasping pawls are moved in synchronism with each other until the front end of the belt-shaped member arrives at the forming drum. After the front end of the belt-shaped member has been pressure-joined with the forming drum, only the rear end grasping pawls grasping the rear end of the belt-shaped member are moved to attach the belt-shaped member to the circumference of the forming drum. The length of the belt-shaped member is modified to a predetermined length or the circumferential length of the forming drum while the front and rear ends are grasped by the front and rear end grasping pawls, respectively, or the belt-shaped member is being attached to the forming drum.

20 Claims, 7 Drawing Sheets

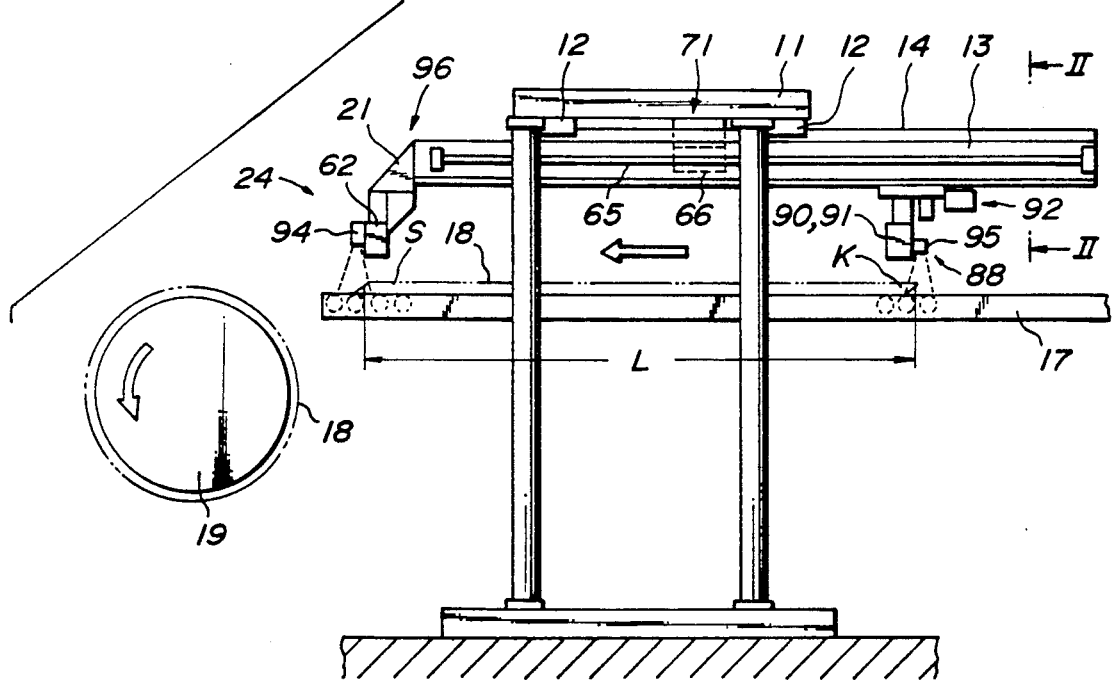

FIG_2
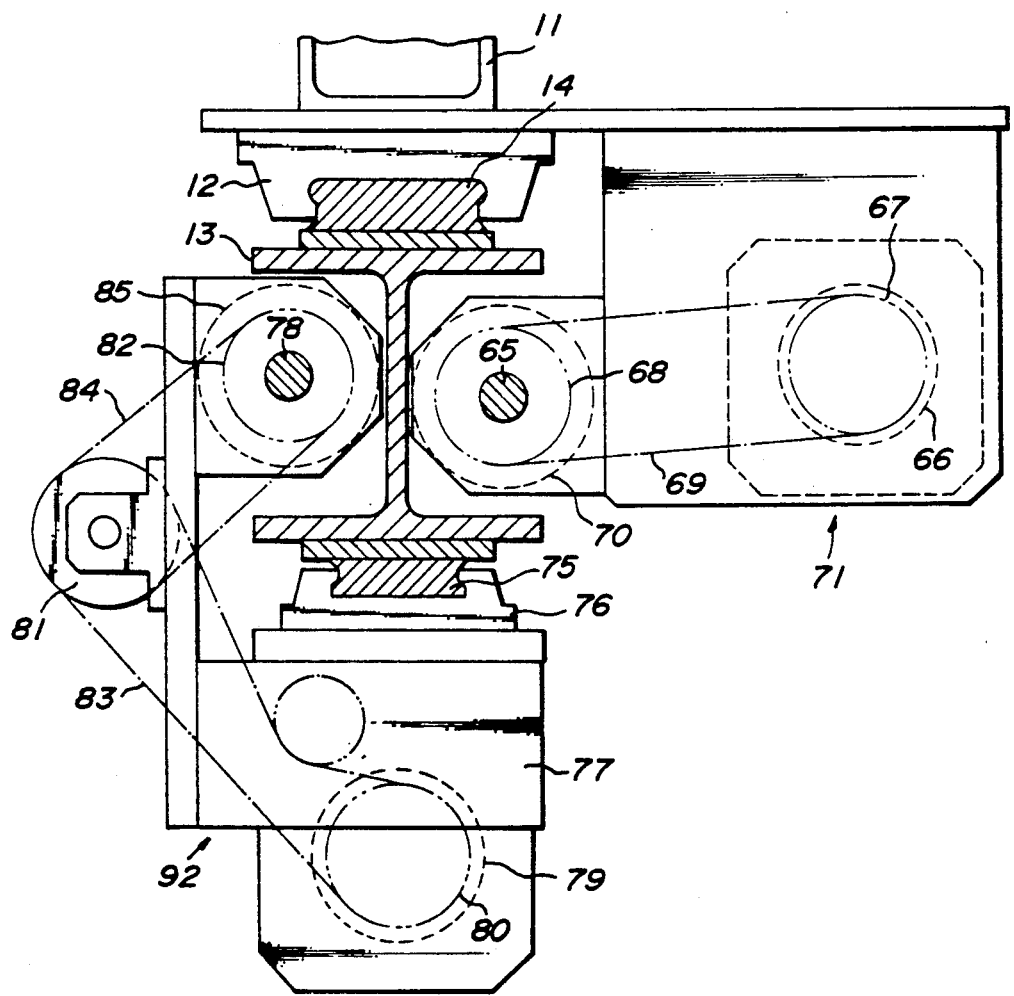

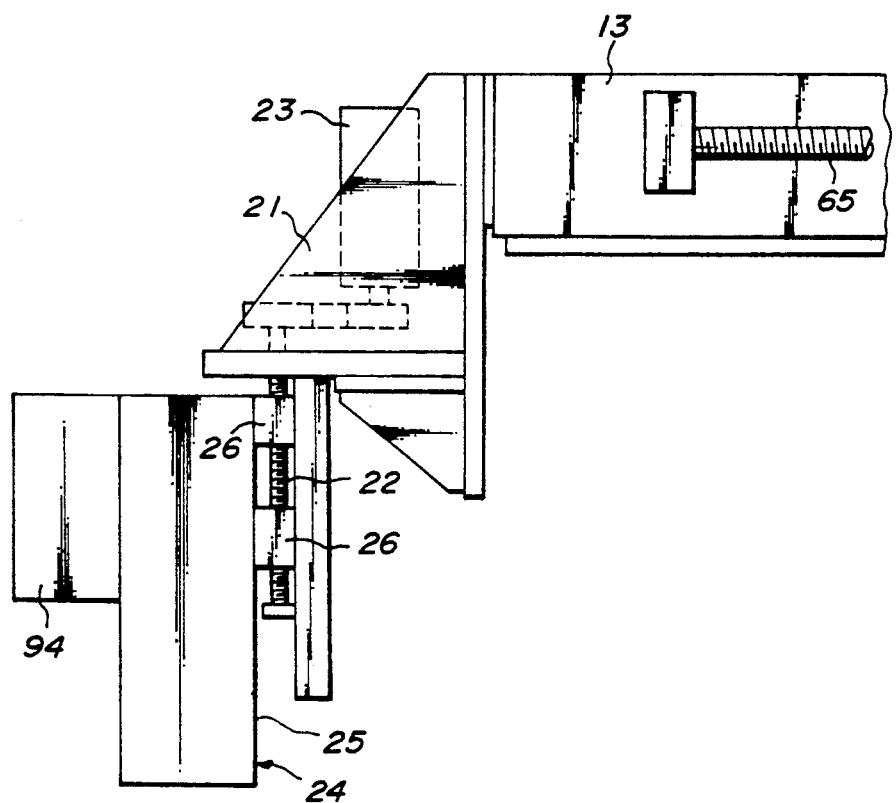

FIG_4
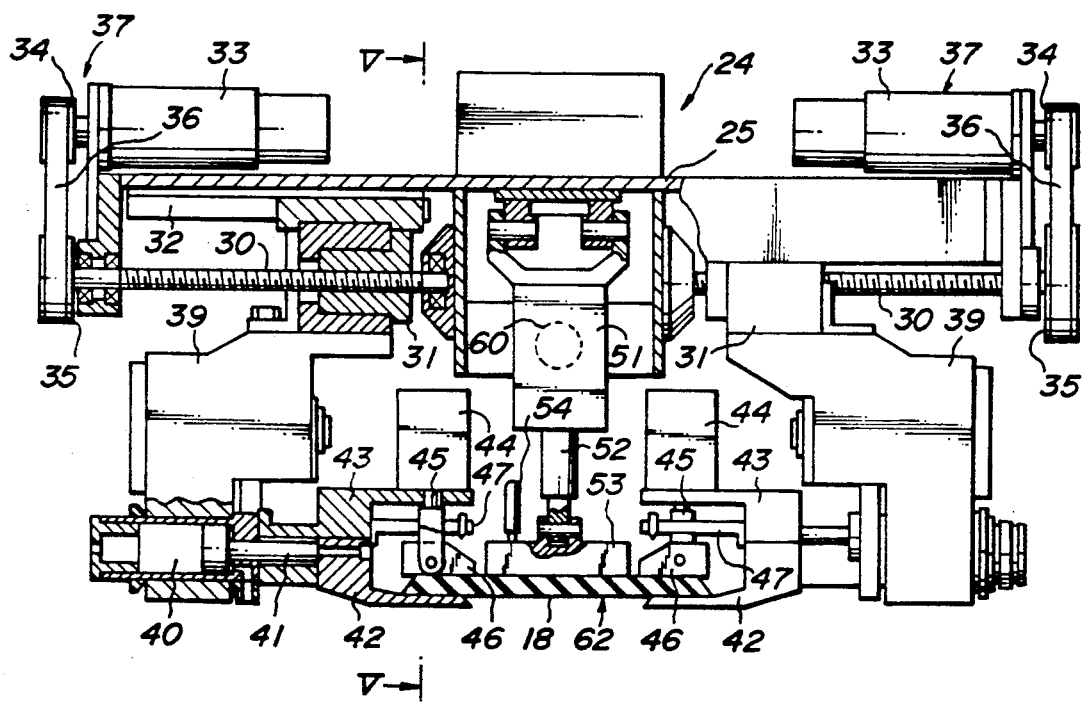

FIG_5
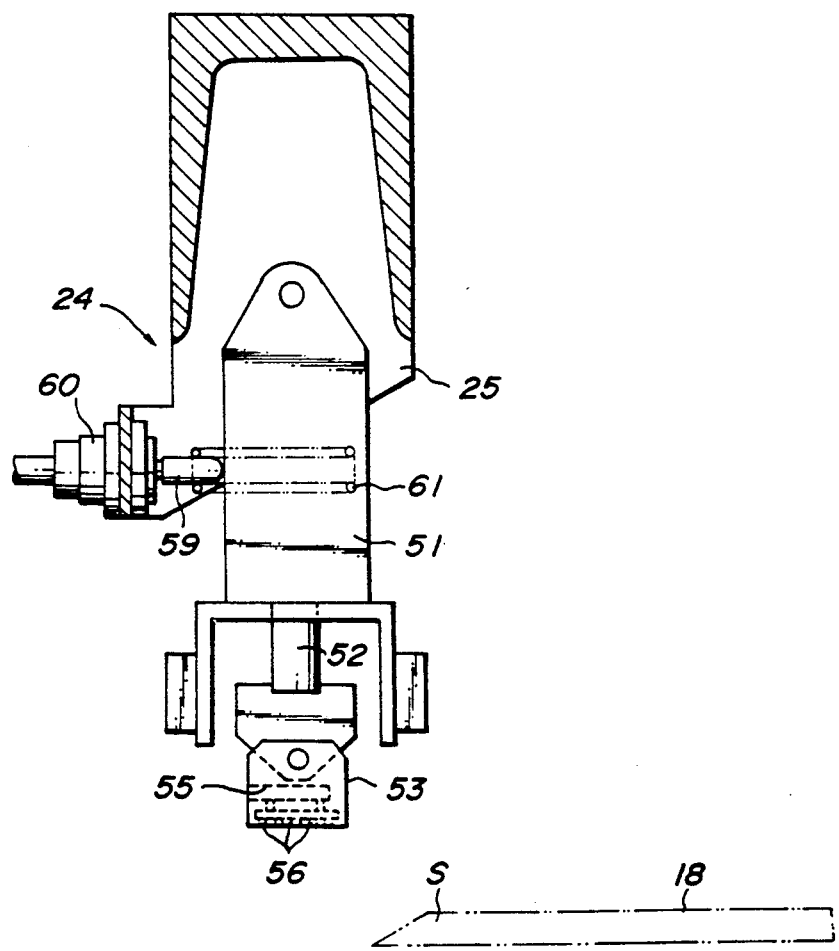
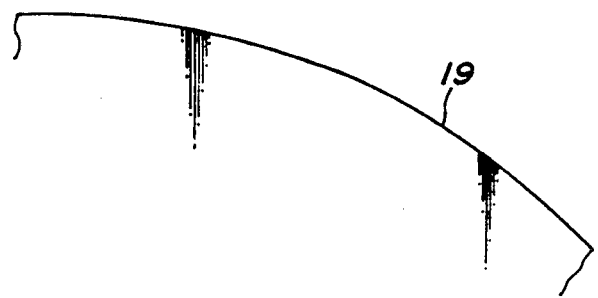

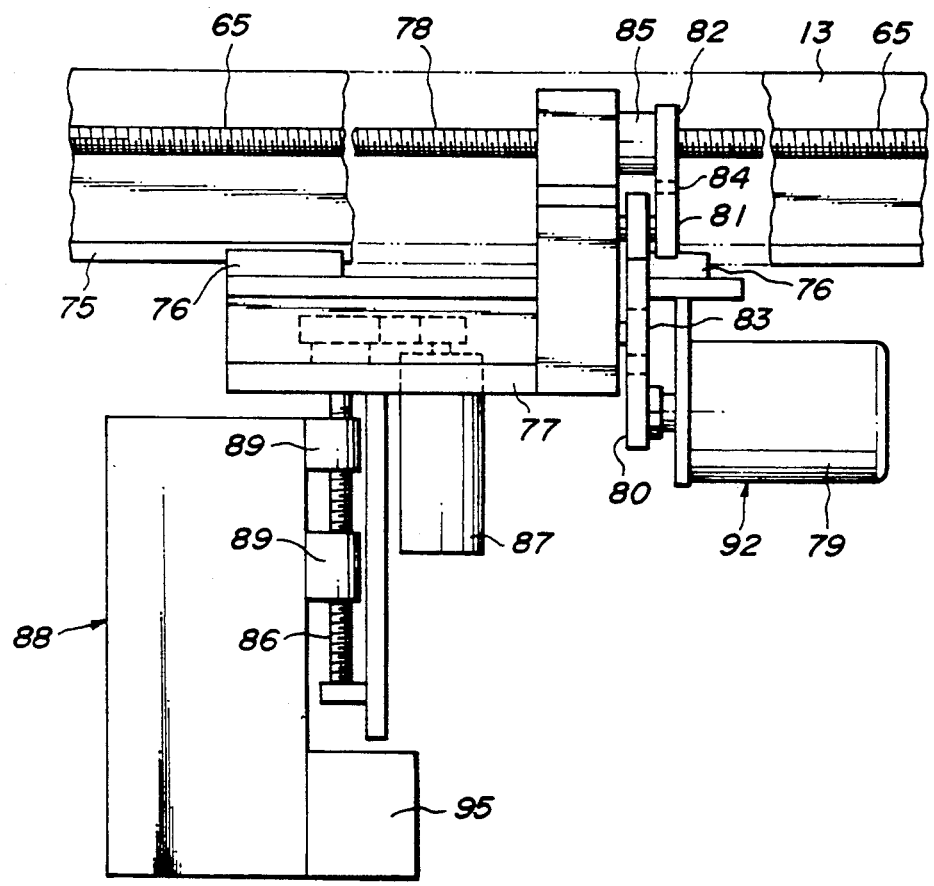
FIG_6

METHOD AND APPARATUS FOR ATTACHING BELT-SHAPED MEMBER TO FORMING DRUM

BACKGROUND OF THE INVENTION

This invention relates to a method and an apparatus for attaching a belt-shaped member, for example, a tread rubber as a constituent member of a pneumatic tire to a forming drum.

Various methods and apparatuses for attaching belt-shaped members have been known, for example, disclosed in Japanese Patent Application Laid-open No. 62-236,728. In the known method, after measuring the length of a belt-shaped member cut in a length substantially equal to the circumferential length of a forming drum, the front end of the belt-shaped member is grasped by grasping means which is then moved to the forming drum to pressure-join the front end of the member with it. Thereafter, the belt-shaped member is supplied to the forming drum, during which the drum is being rotated so that the belt-shaped member is attached to the forming drum around approximately three fourths of its circumference. The grasping means is then returned to the rear end of the belt-shaped member.

The rear end of the belt-shaped member is then grasped by the grasping means which is then moved to the forming drum so as to attach the remaining portion of the belt-shaped member to the rotating forming drum to join the front and rear ends of the belt-shaped member with each other. In the method and apparatus, the supplied speed of the belt-shaped member is made different from the circumferential speed of the forming drum in attaching the remaining portion to the forming drum so that the belt-shaped member is elongated or contracted to bring the length of the attached belt-shaped member into a coincidence with a predetermined length, for example, one circumferential length of the forming drum.

In addition, a method and an apparatus have been known which was disclosed in Japanese Patent application Laid-open No. 1-303,163. In the method and apparatus, after the front end and the rear end of a belt-shaped member cut in a length substantially equal to the circumferential length of a forming drum are grasped by front end grasping means and rear end grasping means, respectively, these front and rear end grasping means with the grasped belt-shaped member are moved in synchronism with each other to plate-shaped transfer means to transfer the belt-shaped member to a position above the plate-shaped transfer means where the front and rear grasping means are moved away from each other to eliminate any loose portion or slack of the belt-shaped member. After the belt-shaped member is held by suction on plate-shaped transfer means, it is moved to the forming drum to attach the belt-shaped member to the circumference of the forming drum.

In the former method and apparatus, however, as only one grasping means is adapted to grasp both the front and rear ends of the belt-shaped member, the moving distances of the grasping means unavoidably become long. As a result, the cycle time for attaching the belt-shaped member to the forming drum is prolonged. Moreover, the adjustment of length of the belt-shaped member is performed with the remaining portion of the belt-shaped member or one fourth of its overall length. Therefore, the relevant portion is locally elongated or contracted so that the thickness or width of the portion is greatly changed to lower the quality of produced tires.

In the latter method and apparatus, after the belt-shaped member has been once transferred onto the plate-shaped transfer means, the belt-shaped member is supplied from the transfer means to forming drum. Therefore, the apparatus is complicated in construction and the operation becomes troublesome. Moreover, the measurement and modification of the lengths of belt-shaped members are not considered in the latter method and apparatus. Therefore, if a belt-shaped member is cut with an error in length, its front and rear ends may be incompletely joined due to the error.

SUMMARY OF THE INVENTION

It is an object of the invention to provide a method of attaching a belt-shaped member to a forming drum, which is carried out in a short cycle time and able to produce high quality tires in easy operation.

It is another object of the invention to provide an apparatus for attaching a belt-shaped member to a forming drum, which is simple in construction and easy to operate and able to produce high quality tires.

In order to accomplish these objects, the method of attaching a belt-shaped member to a forming drum according to the invention, comprises steps of detecting positions of the front and rear ends of the belt-shaped member cut in a length substantially equal to the circumferential length of the forming drum, grasping the front and rear ends of the belt-shaped member, respectively, feeding the belt-shaped member in the state of the grasped front and rear ends to the forming drum to pressure-join the front end to the forming drum, and supplying the belt-shaped member in the state of the grasped rear end to the rotating forming drum to attach the belt-shaped member to the circumference of the forming drum so as to join the front and rear ends of the belt-shaped member with each other, and in attaching the belt-shaped member to the forming drum in the supplying step, changing supplying speeds of the belt-shaped member on the basis of the detected positions of the belt-shaped member to make different between the circumferential speed of the forming drum and the supplying speed of the belt-shaped member, thereby modifying the length of the belt-shaped member to bring the length of the attached belt-shaped member into coincidence with a predetermined length.

In another aspect, the method of attaching a belt-shaped member to a forming drum according to the invention, comprises steps of detecting positions of the front and rear ends of the belt-shaped member cut in a length substantially equal to the circumferential length of the forming drum, grasping the front and rear ends of the belt-shaped member, respectively, feeding the belt-shaped member in the state of the grasped front and rear ends to the forming drum to pressure-join the front end to the forming drum, and supplying the belt-shaped member in the state of the grasped rear end to the rotating forming drum to attach the belt-shaped member to the circumference of the forming drum so as to provide a clearance having a constant width between the front and rear ends of the belt-shaped member, and in attaching the belt-shaped member to the forming drum in the supplying step, changing supplying speeds of the belt-shaped member on the basis of the detected positions of the belt-shaped member to make different between the circumferential speed of the forming drum and the supplying speed of the belt-shaped member, thereby modifying the length of the belt-shaped member to bring the length of the attached belt-shaped member into coincidence with a predetermined length.

In a further aspect, the method of attaching a belt-shaped member to a forming drum according to the invention, comprises steps of detecting positions of the front and rear ends of the belt-shaped member cut in a length substantially equal to the circumferential length of the forming drum, grasping the front and rear ends of the belt-shaped member, respectively, feeding the belt-shaped member in the state of the grasped front and rear ends to the forming drum to pressure-join the front end to the forming drum, and supplying the belt-shaped member in the state of the grasped rear end to the rotating forming drum to attach the belt-shaped member to the circumference of the forming drum so as to join the front and rear ends of the belt-shaped member with each other, and when the front and rear ends of the belt-shaped member are grasped in the grasping step, changing the distance between the front and rear ends of the belt-shaped member on the basis of the detected positions of the belt-shaped member, thereby modifying the length of the belt-shaped member to bring the length of the attached belt-shaped member into coincidence with a predetermined length.

In a preferred aspect, the method of attaching a belt-shaped member to a forming drum according to the invention, comprises steps of detecting positions of the front and rear ends of the belt-shaped member cut in a length substantially equal to the circumferential length of the forming drum, grasping the front and rear ends of the belt-shaped member, respectively, feeding the belt-shaped member in the state of the grasped front and rear ends to the forming drum to pressure-join the front end to the forming drum, and supplying the belt-shaped member in the state of the grasped rear end to the rotating forming drum to attach the belt-shaped member to the circumference of the forming drum so as to provide a clearance having a constant width between the front and rear ends of the belt-shaped member, and when the front and rear ends of the belt-shaped member are grasped in the grasping step, changing the distance between the front and rear ends of the belt-shaped member on the basis of the detected positions of the belt-shaped member, thereby modifying the length of the belt-shaped member to bring the length of the attached belt-shaped member into coincidence with a predetermined length.

The apparatus for attaching a belt-shaped member to a forming drum according to the invention, comprises measuring means for detecting positions of the front and rear ends of the belt-shaped member cut in a length substantially equal to the circumferential length of the forming drum, front end grasping means for grasping the front end of the belt-shaped member and for pressure-joining the front end with the forming drum, rear end grasping means for grasping the rear end of the belt-shaped member and for joining the rear end with the front end of the belt-shaped member on the forming drum, front end driving means for moving the front end grasping means grasping the front end of the belt-shaped member toward the forming drum, and rear end driving means for moving the rear end grasping means grasping the rear end of the belt-shaped member toward the forming drum in synchronism with the movement of the front end grasping means or independently from the front end grasping means after pressure-joining the front end of the belt-shaped member with the forming drum to supply the belt-shaped member to the rotating forming drum so as to attaching it on the circumference of the forming drum, and the rear end driving means being controlled on the basis of results detected by the measuring means to make different the moving speed of the rear end grasping means in attaching the belt-shaped member to the forming drum from the circumferential speed of the forming drum, thereby modifying the length of the belt-shaped member to bring the length of the attached belt-shaped member into coincidence with a predetermined length.

In another aspect, the apparatus for attaching a belt-shaped member to a forming drum according to the invention, comprises measuring means for detecting positions of the front and rear ends of the belt-shaped member cut in a length substantially equal to the circumferential length of the forming drum, front end grasping means for grasping the front end of the belt-shaped member and for pressure-joining the front end with the forming drum, rear end grasping means for grasping the rear end of the belt-shaped member and for joining the rear end with the front end of the belt-shaped member on the forming drum, front end driving means for moving the front end grasping means grasping the front end of the belt-shaped member toward the forming drum, and rear end driving means for moving the rear end grasping means grasping the rear end of the belt-shaped member toward the forming drum in synchronism with the movement of the front end grasping means or independently from the front end grasping means after pressure-joining the front end of the belt-shaped member with the forming drum to supply the belt-shaped member to the rotating forming drum so as to attaching it on the circumference of the forming drum, and when the front and rear end grasping means grasp the front and rear ends of the belt-shaped member, respectively, actuating at least one of the front and rear driving means on the basis of results detected by the measuring means to change the distance between the front and rear ends of the belt-shaped member, thereby modifying the length of the belt-shaped member to bring the length of the belt-shaped member into coincidence with a predetermined length.

In attaching a belt-shaped member to a forming drum, front and rear ends of the member are first detected by the measuring means. The front and rear ends of the belt-shaped member are then grasped by the front and rear end grasping means, respectively. The front end grasping means grasping the front end is moved toward the forming drum by means of the front end driving means, while the rear end grasping means grasping the rear end is moved toward the forming drum by means of the rear end driving means in synchronism with the front end driving means. The front end of the belt-shaped member is pressure-joined to the forming drum. Only the rear end grasping means grasping the rear end is then independently moved toward the forming drum by the rear end driving mean so as to supply the belt-shaped member to the rotating forming drum to attach the belt-shaped member to the circumference of the forming drum.

At this time, the moving speed of the rear end driving means is controlled on the basis of the position of the belt-shaped member to make different the moving speed of the rear end grasping means or the supply speed of the belt-shaped member from the circumferential speed of the forming drum. As a result, the belt-shaped member is elongated or contracted to bring the length of the attached belt-shaped member into coincidence with a predetermined length, for example, the one circumferential length of the forming drum. The rear end of the belt-shaped member is then joined with the front end on the forming drum by the rear end grasping means. In this case, there may be a clearance having a constant width between the front and rear ends of the belt-shaped member when it has been attached to the circumference of the forming drum.

According to the invention, the front and rear ends of the belt-shaped member are grasped by the front and rear end grasping means which are independently movable. Therefore, moving distances of both the front and rear end grasping means are minimum required values. As a result, the cycle time for attaching the belt-shaped member to the forming drum is shortened. According to the invention, moreover, the modification of the length of the belt-shaped member is performed over the full length of the belt-shaped member so that the belt-shaped member is elongated or contracted uniformly over its full length. As a result, the thickness and width of the belt-shaped member are hardly changed so that the quality of produced tires is improved. According to the invention, furthermore, the belt-shaped member is directly supplied to the forming drum so that the apparatus is simple in construction and its operation is easy.

In the present invention, moreover, the modification of the length of the belt-shaped member may be effected in the following manner. When the front and rear ends of the belt-shaped member are grasped by the front and rear end grasping means, respectively, at least one of the front and rear end driving means is actuated on the basis of the detected results to change the distance between the front and rear end grasping means or between the front and rear ends of the belt-shaped member, thereby modifying the length of the belt-shaped member.

In the present invention, the width centers of the front and rear ends of the belt-shaped member may be brought into coincidence with the center of the attaching area of the forming drum, respectively, by making the front and rear end grasping means movable in the width directions of the belt-shaped member. Moreover, in the case that the front end of the belt-shaped member has been centered with accuracy, only the rear end grasping means may be movable in the width direction of the belt-shaped member so that the width center of the rear end of the belt-shaped member is brought into coincidence with the center of the attaching area of the forming drum.

The invention will be more fully understood by referring to the following detailed specification and claims taken in connection with the appended drawings.

BRIEF DESCRIPTION OF THE DRAWINGS

FIG. 1 is a schematic front elevation illustrating the apparatus of one embodiment according to the invention;

FIG. 2 is a sectional view of the apparatus taken along the line II—II in FIG. 1;

FIG. 3 is a front view illustrating the proximity of the front end grasping unit used in the apparatus shown in FIG. 1;

FIG. 4 is a partial sectional view of the proximity of the front end grasping unit shown in FIG. 3;

FIG. 5 is a sectional view of the front end grasping unit taken along the line V—V in FIG. 4;

FIG. 6 is a partial sectional view illustrating the proximity of the rear end grasping unit used in the apparatus shown in FIG. 1.

DESCRIPTION OF THE PREFERRED EMBODIMENTS

Figure 7:
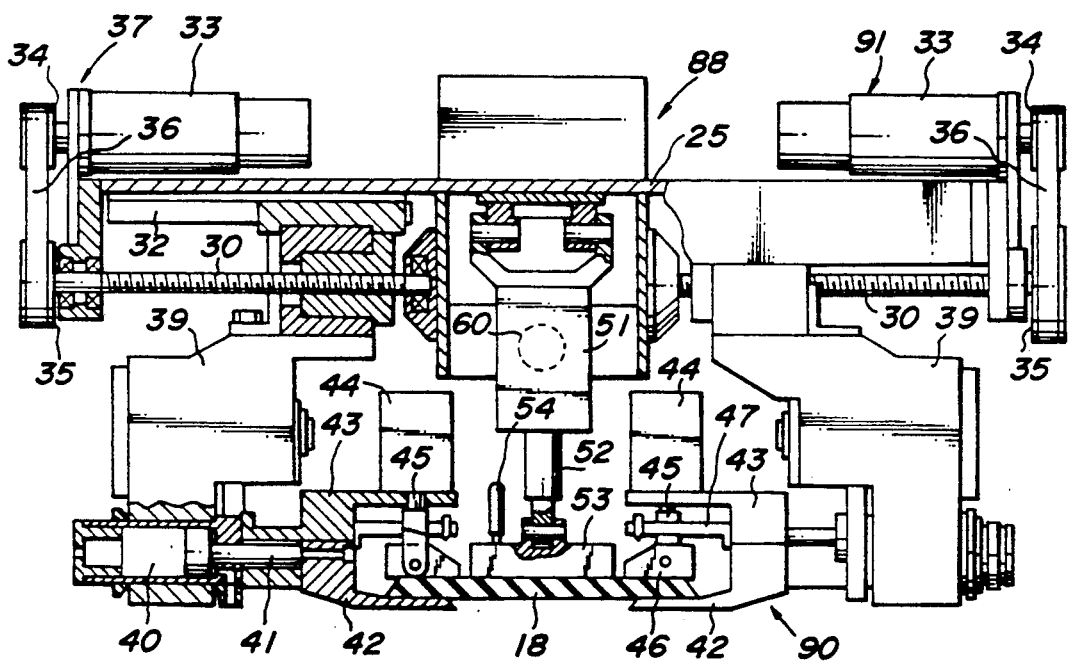
FIG. 7 is a partial sectional view of the proximity of the rear end grasping unit shown in FIG. 6.

Referring to FIGS. 1 and 2, a frame 11 is provided on its upper portion with a plurality of slide bearings 12 fixed thereto. A horizontal beam 13 extends in traverse directions or left and right directions viewed in FIG. 1. A rail 14 is arranged on the upper surface of the beam 13 so as to extend therealong. The rail 14 is slidably supported by the slide bearings 12 so that the beam 13 is supported movably in the traverse directions by the frame 11. A conveyor 17 is arranged below the beam 13 and extends in parallel therewith in order to transfer belt-shaped members such as tread rubbers cut in the length substantially equal to one circumferential length of the forming drum 19 forwardly or toward a forming drum 19. The forming drum 19 is arranged forward of the conveyor 17 and rotatable about a horizontal rotating axis perpendicular to the conveyor 17.

A bracket 21 is fixed to the front end of the beam 13 and a vertical screw shaft 22 is rotatably supported by the bracket 21 as shown in FIGS. 1, 3, 4 and 5. Reference numeral 23 denotes a motor mounted on the bracket 21, whose driving force is transmitted to the vertical screw shaft 22. A front end grasping unit 24 is adapted to grasp the front end S of a belt-shaped member 18 and has a movable frame 25. Female screw members 26 are attached to the rear face of the movable frame 25 and threadedly engaged with the screw shaft 22 so that the front end grasping unit 24 is raised and lowered by rotation of the screw shaft 22.

As shown in FIG. 4, the movable frame 25 rotatably supports at its lengthwise ends a pair of horizontal screw shafts 30 turned in opposite directions and extending perpendicular to the beam 13. Female screw blocks 31 are threadedly engaged on the horizontal screw shafts 30 and slidably engage a pair of rails 32 mounted on the movable frame 25, respectively. Motors 33 are fixed to both the ends of the movable frame 25, whose rotating driving force is transmitted through pulleys 34 and 35 and belts 36 to the horizontal screw shafts 30.

When the motors 33 are energized to rotate the screw shafts 30 in opposite directions, the female screw blocks 31 move equal distances in the same direction. The horizontal screw shafts 30, the female screw blocks 31, the rails 32, the motors 33, the pulleys 34 and 35, and belts 36 form as a whole two centering means 37. These centering means 37 serve to displace the belt-shaped member 18 grasped by front end grasping means 62 later described in width directions of the member 18 so that the width center of the front end S of the belt-shaped member 18 is brought into coincidence with the center of the attaching area of the forming drum 19 on which the belt-shaped member 18 is to be attached. When the motors 33 are energized to rotate the screw shafts 30 in the same directions, the female screw blocks 31 move equal distances in the opposite directions or toward and away from each other.

Fixed to each of the female screw blocks 31 is a movable block 39 having at its lower end a cylinder 40 mounted thereon extending in parallel with the screw shaft 30. A lower pawl 42 is fixed to the outer end of the piston rod 41 of the cylinder 40 and adapted to engage the lower face of the belt-shaped member 18 at the side edge of one width end thereof. The lower pawls 42 on both the sides are moved in the width directions of the belt-shaped member 18 toward and away from each other by extension and retraction of the piston rods 41 of the cylinders 40. A block 43 is fixed to the rod end of each of the cylinders 40. A vertical cylinder 44 is fixed to the block 43. An upper pawl 46 forming a pair with the lower pawl 42 is rotatably connected to the outer end of piston rod 45 of each of the vertical cylinders 44. Upon actuating the vertical cylinder 44, the upper pawl 46 moves toward and away from the lower pawl 42. Therefore, the upper and lower pawls 46 and 42 of the movable blocks 39 grasp both the side edges of the front end S of the belt-shaped member 18. Each of stoppers 47 serves to stop the rotation of the upper pawl 46 at its extreme position.

Rotatably connected to the center of the movable frame 25 is the head end of a cylinder 51 whose piston rod 52 has the outer end to which is rotatably connected a pressure-joining member 53. As shown in FIG. 5, the pressure-joining member 53 is formed therein with a passage 55 connected through a pipe 54 (FIG. 4) with a vacuum source and communicating with a number of suction openings 56 which open at the lower surface of the pressure-joining member 53. The pressure-joining member 53 is located between the upper pawls 46 and able to hold by suction the center portion of the front end of the belt-shaped member 18 on its upper surface. Moreover, when the piston rod 52 extends from the cylinder 51, the pressure-joining member 53 moves in the direction of thickness of the belt-shaped member 18 to urge it against the forming drum 19 so that the center portion of the front end S of the belt-shaped member 18 is attached to the forming drum 19.

Moreover, a pin cylinder 60 having a piston rod 59 is fixed to the movable frame 25, and the cylinder 51 is provided with a spring 61 to urge the cylinder 51 toward the pin cylinder 60. The movable blocks 39, the cylinders 40, the lower pawls 42, the blocks 43, cylinders 44, the upper pawls 46, the stoppers 47, the cylinder 51, the pressure-joining member 53, the pin cylinder 60, and the spring 61 form as a whole the front end grasping means 62. The front end grasping means 62 serve to grasp the front end S of the belt-shaped member 18 and to pressure-join the front end S with the forming drum 19.

Referring back to FIGS. 1, 2 and 3, the beam 13 is provided on its one side with a screw shaft 65 which is fixed with its ends to the beam 13 and extends in parallel with the beam 13. A motor 66 is mounted on the frame 11, whose rotating driving force is transmitted through pulleys 67 and 68 and a belt 69 to a female screw block 70 rotatably supported by the frame 11. The female screw block 70 is threadedly engaged on the screw shaft 65. As a result, when the motor 66 is energized to rotate the female screw block 70, the screw shaft 65, the beam 13, and front end grasping means 62 are moved and guided by the slide bearings 12 in traverse directions or toward and away from the forming drum 19. The screw shaft 65, the motor 66, the pulleys 67 and 68, and the belt 69 form as a whole front end driving means 71 for moving the front end grasping means 62 toward and away from the forming drum 19.

Referring to FIGS. 1, 2, 6 and 7, the beam 13 is provided on its lower surface with a rail 75 extending along the beam 13. Slide bearings 76 are mounted on a slide frame 77 and slidably engaging the rail 75. The beam 13 is further provided on the side opposite to the screw shaft 65 with a screw shaft 78 which extends in parallel with the beam 13 and is fixed with its ends to the beam 13. A motor 79 is mounted on the slide frame 77, whose rotating driving force is transmitted through pulleys 80, 81 and 82 and belts 83 and 84 to a female screw block 85 rotatably supported on the upper portion of the slide frame 77. The female screw block 85 is threadedly engaged on the screw shaft 78. As a result, when the motor 79 is energized to rotate the female screw block 85, the slide frame 77 and the female screw block 85 are movably guided by the rail 75 in the traverse directions or the extending directions of the beam 13.

The slide frame 77 rotatably supports a vertical screw shaft 86 to which the rotating driving force of a motor 87 mounted on the slide frame 77 is transmitted. A rear end grasping unit 88 serves to grasp the rear end K of the belt-shaped member 18 and is provided with a plurality of female screw blocks 89 adapted to be threadedly engaged with the screw shaft 86. The rear end grasping unit 88 comprises rear end grasping means 90 which is similar in construction to the front end grasping means 62 and able to join the rear end of the belt-shaped member 18 to the front end thereof on the forming drum 19, and further comprises centering means 91 which is similar in construction to the centering means 37 and able to displace the rear end grasping means 90 in width directions of the belt-shaped member 18.

In order to avoid a repeated explanation, like components of the rear end grasping unit 88 will be designated by the same reference numerals as those of the front end grasping unit 24 and will not be described in further detail. Moreover, the screw shaft 78, the motor 79, the pulleys 80, 81 and 82 and the belts 83 and 84 form as a whole rear end driving means 92 for driving the rear end grasping means 90 in synchronism with or independently from the movement of the front end grasping means 62 toward the forming drum 19.

Referring to FIGS. 1, 3 and 6, a front end image pickup device 94, for example, a camera with an electronic shutter is fixed to the forward end of the front end grasping unit 24. The front end image pickup device 94 detects or photographs the front end S of the belt-shaped member 18 which has been stopped at a predetermined position on the conveyor 17, and feeds the detected result to a control unit, for example, a microcomputer (not shown). On the other hand, a rear end image pickup device 95 is fixed to the rearward end of the rear end grasping unit 88. The rear end image pickup device 95 detects or photographs the rear end K of the belt-shaped member 18 which has been stopped at a predetermined position on the conveyor 17, and feeds the detected result to the control unit. In this case, the control unit detects the front and rear ends of the belt-shaped member 18 with the aid of the detected results fed from both the image pickup devices, and calculates the distance between the front and rear ends of the belt-shaped member 18 to obtain the length L of the member 18.

The front and rear end image pickup devices 94 and 95 and the control unit form as a whole measuring means 96 for measuring or detecting the positions of the front and rear ends of the belt-shaped member 18. In this embodiment, moreover, the control unit detects the center position of the belt-shaped member 18 by referring to the detected results fed from the front and rear end image pickup devices 94 and 95. If the center of the belt-shaped member 18 is shifted from the center of the attaching area of the forming drum 19, the centering means 37 and 91 of the front and rear end grasping units 24 and 88 are actuated to displace the front and rear grasping means 62 and 90 in width directions of the belt-shaped member 18 so that the center of the member 18 is brought into coincidence with the center of the attaching area of the forming drum 19.

Moreover, the control unit controls the operation of the rear end driving means 92 utilizing the detected results to make different the moving speed of the rear end grasping means 90 from the circumferential speed of the forming drum 19 upon attaching the belt-shaped member 18 to the forming drum 19, with the result that the belt-shaped member 18 is elongated or contracted to modify the length L of the belt-shaped member 19. As an alternative, the length L of the belt-shaped member 18 may be modified in the following manner. When the front end S and the rear end K of the belt-shaped member 18 are grasped by the front and rear end grasping means 62 and 90, respectively, at least one of the front and rear end driving means 71 and 92 may be controlled by the control unit so that the distance between the front and rear end grasping means 62 and 90 is changed to elongate or contract the length of the belt-shaped member 18.

The operation of the embodiment according to the invention will be explained in detail hereinafter.

First, a belt-shaped member 18 cut in a length substantially equal to the one circumferential length of the forming drum 19 is transferred to a predetermined position by the conveyor 17. Then the front and rear end image pickup devices 94 and 95 photograph the front and rear ends S and K of the belt-shaped member 18, respectively, and send the results to the control unit. The control unit processes the results to determine the positions of the front and rear ends of the belt-shaped member 18 to obtain the length L of the member 18 and the width center of the member 18. Thereafter, the control unit obtains a difference between the length L of the member 18 and a predetermined length or the one circumferential length of the forming drum 19 to determine an amount to be modified for the length of the belt-shaped member 18, and obtains a difference between the width center of the belt-shaped member 18 and the center of the attaching area of the forming drum 19 to determine a distance to be shifted in the width direction for the belt-shaped member 18.

The motors 23 and 87 are then energized in synchronism with each other to rotate the screw shafts 22 and 86 so that the front and rear end grasping means 62 and 90 are lowered. This downward movements of the front and rear end grasping means 62 and 90 are stopped when the belt-shaped member 18 is positioned between the lower pawls 42 and upper pawls 46 of the front and rear end grasping means 62 and 90. The motors 33 of the front and rear end grasping unit 24 and 88 are then energized to rotate the screw shafts 30, so that the lower pawls 42 are moved toward each other and the upper pawls 46 are also moved toward each other until the lower pawls 42 of the front and rear end grasping means 62 and 90 partially penetrate predetermined distances under the front end S and the rear end K of the belt-shaped member 18, respectively. The cylinders 44 of the front and rear end grasping means 62 and 90 are then actuated to extend their piston rods 45 to lower the upper pawls 46 so that the front end S and the rear end K of the belt-shaped member 18 are grasped on both sides thereof by the front and rear end grasping means 62 and 90, respectively.

Thereafter, the cylinders 51 of the front and rear end grasping units 24 and 88 are actuated to extend their piston rods 52 so that the pressure-joining members 53 are brought into abutment against the upper surfaces of the center portions of the front and rear ends S and K of the belt-shaped member 18, respectively, and at the same time, the belt-shaped member 18 is held by the suction force derived from the suction openings 56 at the lower surfaces of the pressure-joining members 53. If the width center of the belt-shaped member 18 is shifted from the center of the attaching area of the forming drum, the motor 33 of the grasping means 62 or 90 grasping the shifted end is actuated by signals transmitted from the control unit. As a result, the screw shafts 30 are rotated in opposite directions to drive the grasping means 62 or 90 grasping one end of the belt-shaped member 18 in one width direction. Consequently, the width center of the belt-shaped member 18 is brought into coincidence with the center of the attaching area of the forming drum 19. Thereafter, the motors 23 and 87 are energized in synchronism with each other to raise the front and rear end grasping means 62 and 90 to the same level so that the belt-shaped member 18 is moved away from the conveyor 17.

The motor 66 of the front end driving means 71 is then energized to rotate the block 70. As a result, the beam 13 and the front and rear end grasping means 62 and 90 are moved in unison toward the forming drum 19. At this moment, the motor 79 of the rear end driving means 92 is not energized so that the distance between the front and rear end grasping means 62 and 90 is invariably maintained, with the result that the belt-shaped member 18 is forwardly transferred, while being kept in the state when it is grasped. When the front end grasping means 62 has been moved to the position immediately above the uppermost portion of the forming drum 19, the motor 66 is deenergized.

Thereafter, the motor 23 is energized to lower the front end grasping means 62 to the surface of the forming drum 19. At the same time, the rear end grasping means 90 is also lowered in the same manner. The cylinder 51 of the front end grasping means 62 is actuated to extend its piston rod 52 so that the width center of the front end S of the belt-shaped member 18 is urged against the forming drum 19 and pressure-joined with the forming drum 19. Thereafter, the cylinders 44 are actuated to retract their piston rods 45 so that the upper pawls 46 are raised to release the belt-shaped member 18 from the grasping of the upper and lower pawls. Thereafter, the cylinders 40 of the front end grasping means 62 are actuated to retract their piston rods 41, so that the lower pawls 42 are moved away from each other so as to retract from the positions under the belt-shaped member 18. After the front end S of the belt-shaped member 18 is released from the holding of the pressure-joining member 53 by suction, the cylinder 51 is actuated to retract its piston rod 52 so that the pressure-joining member 53 is raised upwardly.

Thereafter, the motor 23 is energized to raise the front end grasping unit 24 and then the motor 66 of the front end driving means 71 is energized to move the beam 13 and the front end grasping unit 24 through a predetermined distance so that the front end grasping means 62 is retracted from the position immediately above the forming drum 19. In this case, if the rear end grasping means 90 is moved together with the front end grasping means 62, the belt-shape member 18 will be loosened. Therefore, the motor 79 of the rear end driving means 92 is energized in synchronism with the motor 66 to rotate the female screw block 85 so that the rear end grasping means 90 is retracted at the same speed as the advancing speed of the beam 13. As a result, the rear end grasping means 90 is stationary relative to the forming drum 19, with the result that any loosening or slack of the belt-shaped member 18 is prevented.

In the first aspect of the invention, the forming drum 19 is then rotated and the motor 79 of the rear end driving means 92 is energized to rotate the female screw block 85. As a result, only the rear end grasping means 90 grasping the rear and K of the belt-shaped member 18 is moved toward the forming drum independently from the front end grasping means 62 so that the belt-shaped member 18 is supplied to the forming drum 19. By virtue of this operation, the belt-shaped member 18 is attached to the circumference of the forming drum 19. Upon attaching the belt-shaped member 18 to the forming drum 19 in this manner, signals corresponding to the amount to be modified in length are transmitted from the control unit to the motor 79 of the rear end driving means 92 so that the moving speed of the rear end grasping means 90 or the supplying speed of the belt-shaped member 18 is made different from the circumferential speed of the forming drum 19. As a result, the belt-shaped member 18 is elongated or contracted over its entire length so that the length L of the belt-shaped member 18 is modified so as to be coincident with a predetermined length, for example, the one circumferential length of the forming drum 19 if the front and rear ends of the member 18 are butt-joined with each other, or the length of the one circumferential length plus an overlapping width if the front and rear ends are joined by overlapping.

When the belt-shaped member 18 is attached over its entire length to the forming drum 19 with its front and rear ends butt-joined or overlapped with a predetermined width, the rear end grasping means 90 arrives at the uppermost portion of the forming drum 19. Thereafter, the cylinder 51 of the rear end grasping means 90 is actuated to extend its piston rod 52 so that the center of the rear end K of the belt-shaped member 18 is urged against the forming drum 19 by means of the pressure-joining member 53 of the rear end grasping means 90. As a result, the width center of the rear end of the belt-shaped member 18 is pressed against and joined with the width center of the front end of the member 18.

After the cylinders 40 are then actuated to retract their piston rods 41 to draw out the lower pawls 42 from the positions under the belt-shaped member 18, the cylinders 44 are actuated to extend their piston rods 45 so that both side edge portions of the rear end of the belt-shaped member 18 are pressed against the both side edge portions of the front end of the member 18, with the result that the front and rear ends of the belt-shaped member 18 are joined with each other uniformly over their widths. The cylinders 44 are then actuated to retract their piston rods 45 to raise the upper pawls 46. Thereafter, the belt-shaped member 18 is released from the suction of the pressure-joining member 53, and the cylinder 51 is actuated to retract its piston rod 52 to raise the pressure-joining member 53. The motor 87 is energized to raise the rear end grasping unit 88 and then the rear end grasping means 90 is retracted by means of the rear end driving means 92 until the distance between the front and rear end grasping means 62 and 90 becomes the initial value. The motor 66 of the front end driving means 71 is then energized to return the beam 13 and the front and rear end grasping means 62 and 90 in unison into the initial positions.

In this embodiment, the front end S and the rear end K of the belt-shaped member 18 are grasped by the front and rear end grasping means 62 and 90, respectively, which are independently movable. Therefore, minimum moved distances of both the grasping means 62 and 90 suffice to perform the attaching of the belt-shaped member to the forming drum. As a result, cycle time for the attaching operation can be shortened. Moreover, the modification of the length L of the belt-shaped member 18 is effected on its entire length so that the member 18 is elongated or contracted uniformly over its length. Consequently, the quality of tires produced by the belt-shaped members thus attached to the forming drum is improved because thicknesses and widths of the belt-shaped members are not changed. In this embodiment, moreover, as the belt-shaped member 18 is directly supplied onto the forming drum 19, the apparatus for carrying out the invention is simple in construction and the operation is easy.

The above operation is in one cycle for carrying out the invention. Thereafter, this cycle is repeatedly effected. If the sizes of the belt-shaped members are changed, the initial stopped positions of the rear end grasping means 90 and the rear end image pickup device 95 may be adjusted.

In the above embodiment, the width center of the belt-shaped member 18 is detected by the front and rear end image pickup devices 94 and 95 to obtain a shifted distance of the center of the belt-shaped member from the center of the attaching area of the forming drum 19, and the front and rear end grasping means 62 and 90 are displaced in the width directions of the belt-shaped member 18 to accomplish its centering. However, in the case that the belt-shaped member 18 is sufficiently exactly centered when it is supplied to the conveyor 17, the centering operation above described is not needed. In the above embodiment, moreover, the modification of the length L of the belt-shaped member 18 is effected by moving the rear end grasping means 90. It may be effected by moving only the front end grasping means 62 or both the front and rear end grasping means 62 and 90 in the present invention.

Moreover, the belt-shaped member 18 may be grasped with the aid of vacuum or negative pressure in the present invention. Further, photoelectric sensors or the like may be utilized for measuring the length of the belt-shaped member 18. When the belt-shaped member 18 has been attached to the circumference of the forming drum 19, it is acceptable that there is a clearance having a constant width between the front and rear ends of the belt-shaped member 18. Moreover, in the event that the front end of the belt-shaped member 18 has been already centered, the width center of the rear end of the belt-shaped member 18 may be brought into coincidence with the center of the attaching area of the forming drum 19 only by the rear end grasping means 90 movable in the width directions of the belt-shaped member 18 in the present invention.

As can be seen from the above explanation, the invention serves to shorten the cycle time for attaching a belt-shaped member to a forming drum and to improve the quality of produced tires. The apparatus for carrying out the invention is simple in construction and makes easy the attaching operation.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of attaching a belt-shaped member to a forming drum, comprising steps of detecting positions of the front and rear ends of the belt-shaped member cut in a length substantially equal to the circumferential length of the forming drum, grasping the front and rear ends of the belt-shaped member, respectively, feeding the belt-shaped member in the state of the grasped front and rear ends to the forming drum to pressure-join the front end to the forming drum, and supplying the belt-shaped member in the state of the grasped rear end to the rotating forming drum to attach the belt-shaped member to the circumference of the forming drum so as to join the front and rear ends of the belt-shaped member with each other, and in attaching the belt-shaped member to the forming drum in said supplying step, changing supplying speeds of the belt-shaped member on the basis of the detected positions of the belt-shaped member to make different between the circumferential speed of the forming drum and the supplying speed of the belt-shaped member, thereby modifying the length of the belt-shaped member to bring the length of the attached belt-shaped member into coincidence with a predetermined length.

2. The method claimed in claim 1, wherein when the front and rear ends of the belt-shaped member are grasped, the rear end is displaced in one width direction to bring the width center of the rear end of the belt-shaped member into coincidence with the center of the attaching area of the forming drum.

3. The method claimed in claim 1, wherein when the front and rear ends of the belt-shaped member are grasped, the front and rear ends are displaced in width directions to bring the width centers of the front and rear ends of the belt-shaped member into coincidence with the center of the attaching area of the forming drum.

4. A method of attaching a belt-shaped member to a forming drum, comprising steps of detecting positions of the front and rear ends of the belt-shaped member cut in a length substantially equal to the circumferential length of the forming drum, grasping the front and rear ends of the belt-shaped member, respectively, feeding the belt-shaped member in the state of the grasped front and rear ends to the forming drum to pressure-join the front end to the forming drum, and supplying the belt-shaped member in the state of the grasped rear end to the rotating forming drum to attach the belt-shaped member to the circumference of the forming drum so as to provide a clearance having a constant width between the front and rear ends of the belt-shaped member, and in attaching the belt-shaped member to the forming drum in said supplying step, changing supplying speeds of the belt-shaped member on the basis of the detected positions of the belt-shaped member to make different between the circumferential speed of the forming drum and the supplying speed of the belt-shaped member, thereby modifying the length of the belt-shaped member to bring the length of the attached belt-shaped member into coincidence with a predetermined length.

5. The method claimed in claim 4, wherein when the front and rear ends of the belt-shaped member are grasped, the rear end is displaced in one width direction to bring the width center of the rear end of the belt-shaped member into coincidence with the center of the attaching area of the forming drum.

6. The method claimed in claim 4, wherein when the front and rear ends of the belt-shaped member are grasped, the front and rear ends are displaced in width directions to bring the width centers of the front and rear ends of the belt-shaped member into coincidence with the center of the attaching area of the forming drum.

7. A method of attaching a belt-shaped member to a forming drum, comprising steps of detecting positions of the front and rear ends of the belt-shaped member cut in a length substantially equal to the circumferential length of the forming drum, grasping the front and rear ends of the belt-shaped member, respectively, feeding the belt-shaped member in the state of the grasped front and rear ends to the forming drum to pressure-join the front end to the forming drum, and supplying the belt-shaped member in the state of the grasped rear end to the rotating forming drum to attach the belt-shaped member to the circumference of the forming drum so as to join the front and rear ends of the belt-shaped member with each other, and when the front and rear ends of the belt-shaped member are grasped in said grasping step, changing the distance between the front and rear ends of the belt-shaped member on the basis of the detected positions of the front and rear ends of the belt-shaped member, thereby modifying the length of the belt-shaped member to bring the length of the attached belt-shaped member into coincidence with a predetermined length.

8. The method claimed in claim 7, wherein when the front and rear ends of the belt-shaped member are grasped, the rear end is displaced in one width direction to bring the width center of the rear end of the belt-shaped member into coincidence with the center of the attaching area of the forming drum.

9. The method claimed in claim 7, wherein when the front and rear ends of the belt-shaped member are grasped, the front and rear ends are displaced in width directions to bring the width centers of the front and rear ends of the belt-shaped member into coincidence with the center of the attaching area of the forming drum.

10. A method of attaching a belt-shaped member to a forming drum, comprising steps of detecting positions of the front and rear ends of the belt-shaped member cut in a length substantially equal to the circumferential length of the forming drum, grasping the front and rear ends of the belt-shaped member, respectively, feeding the belt-shaped member in the state of the grasped front and rear ends to the forming drum to pressure-join the front end to the forming drum, and supplying the belt-shaped member in the state of the grasped rear end to the rotating forming drum to attach the belt-shaped member to the circumference of the forming drum so as to provide a clearance having a constant width between the front and rear ends of the belt-shaped member, and when the front and rear ends of the belt-shaped member are grasped in said grasping step, changing the distance between the front and rear ends of the belt-shaped member on the basis of the detected positions of the front and rear ends of the belt-shaped member, thereby modifying the length of the belt-shaped member to bring the length of the attached belt-shaped member into coincidence with a predetermined length.

11. The method claimed in claim 10, wherein when the front and rear ends of the belt-shaped member are grasped, the rear end is displaced in one width direction to bring the width center of the rear end of the belt-shaped member into coincidence with the center of the attaching area of the forming drum.

12. The method claimed in claim 10, wherein when the front and rear ends of the belt-shaped member are grasped, the front and rear ends are displaced in width directions to bring the width centers of the front and rear ends of the belt-shaped member into coincidence with the center of the attaching area of the forming drum.

13. An apparatus for attaching a belt-shaped member to a forming drum, comprising measuring means for detecting positions of the front and rear ends of the belt-shaped member cut in a length substantially equal to the circumferential length of the forming drum, front end grasping means for grasping the front end of the belt-shaped member and for pressure-joining the front end with the forming drum, rear end grasping means for grasping the rear end of the belt-shaped member and for joining the rear end with the front end of the belt-shaped member on the forming drum, front end driving means for moving the front end grasping means grasping the front end of the belt-shaped member toward the forming drum, and rear end driving means for moving the rear end grasping means grasping the rear end of the belt-shaped member toward the forming drum in synchronism with the movement of the front end grasping means to supply the belt-shaped member to the rotating forming drum so as to attaching it on the circumference of the forming drum, and the rear end driving means being controlled on the basis of results detected by the measuring means to make different the moving speed of the rear end grasping means in attaching the belt-shaped member to the forming drum from the circumferential speed of the forming drum, thereby modifying the length of the belt-shaped member to bring the length of the attached belt-shaped member into coincidence with a predetermined length.

14. The apparatus claimed in claim 13, wherein the front and rear end grasping means are movable in width directions of the belt-shaped member to enable the width centers of the front and rear ends of the belt-shaped member to be brought into coincidence with the center of the attaching area of the forming drum, respectively.

15. An apparatus for attaching a belt-shaped member to a forming drum, comprising measuring means for detecting positions of the front and rear ends of the belt-shaped member cut in a length substantially equal to the circumferential length of the forming drum, front end grasping means for grasping the front end of the belt-shaped member and for pressure-joining the front end with the forming drum, rear end grasping means for grasping the rear end of the belt-shaped member and for joining the rear end with the front end of the belt-shaped member on the forming drum, front end driving means for moving the front end grasping means grasping the front end of the belt-shaped member toward the forming drum, and rear end driving means for moving the rear end grasping means grasping the rear end of the belt-shaped member toward the forming drum independently from the front end grasping means after pressure-joining the front end of the belt-shaped member with the forming drum to supply the belt-shaped member to the rotating forming drum so as to attaching it on the circumference of the forming drum, and the rear end driving means being controlled on the basis of results detected by the measuring means to make different the moving speed of the rear end grasping means in attaching the belt-shaped member to the forming drum from the circumferential speed of the forming drum, thereby modifying the length of the belt-shaped member to bring the length of the attached belt-shaped member into coincidence with a predetermined length.

16. The apparatus claimed in claim 15, wherein the front and rear end grasping means are movable in width directions of the belt-shaped member to enable the width centers of the front and rear ends of the belt-shaped member to be brought into coincidence with the center of the attaching area of the forming drum, respectively.

17. An apparatus for attaching a belt-shaped member to a forming drum, comprising measuring means for detecting positions of the front and rear ends of the belt-shaped member cut in a length substantially equal to the circumferential length of the forming drum, front end grasping means for grasping the front end of the belt-shaped member and for pressure-joining the front end with the forming drum, rear end grasping means for grasping the rear end of the belt-shaped member and for joining the rear end with the front end of the belt-shaped member on the forming drum, front end driving means for moving the front end grasping means grasping the front end of the belt-shaped member toward the forming drum, and rear end driving means for moving the rear end grasping means grasping the rear end of the belt-shaped member toward the forming drum in synchronism with the movement of the front end grasping means to supply the belt-shaped member to the rotating forming drum so as to attaching it on the circumference of the forming drum, and when the front and rear end grasping means grasp the front and rear ends of the belt-shaped member, respectively, actuating at least one of the front and rear driving means on the basis of results detected by the measuring means to change the distance between the front and rear ends of the belt-shaped member, thereby modifying the length of the belt-shaped member to bring the length of the belt-shaped member into coincidence with a predetermined length.

18. The apparatus claimed in claim 17, wherein the front and rear end grasping means are movable in width directions of the belt-shaped member to enable the width centers of the front and rear ends of the belt-shaped member to be brought into coincidence with the center of the attaching area of the forming drum, respectively.

19. An apparatus for attaching a belt-shaped member to a forming drum, comprising measuring means for detecting positions of the front and rear ends of the belt-shaped member cut in a length substantially equal to the circumferential length of the forming drum, front end grasping means for grasping the front end of the belt-shaped member and for pressure-joining the front end with the forming drum, rear end grasping means for grasping the rear end of the belt-shaped member and for joining the rear end with the front end of the belt-shaped member on the forming drum, front end driving means for moving the front end grasping means grasping the front end of the belt-shaped member toward the forming drum, and rear end driving means for moving the rear end grasping means grasping the rear end of the belt-shaped member toward the forming drum independently from the front end grasping means after pressure-joining the front end of the belt-shaped member with the forming drum to supply the belt-shaped member to the rotating forming drum so as to attaching it on the circumference of the forming drum, and when the front and rear end grasping means grasp the front and rear ends of the belt-shaped member, respectively, actuating at least one of the front and rear driving means on the basis of results detected by the measuring means to change the distance between the front and rear ends of the belt-shaped member, thereby modifying the length of the belt-shaped member to bring the length of the belt-shaped member into coincidence with a predetermined length.

20. The apparatus claimed in claim 19, wherein the front and rear end grasping means are movable in width directions of the belt-shaped member to enable the width centers of the front and rear ends of the belt-shaped member to be brought into coincidence with the center of the attaching area of the forming drum, respectively.

* * * * *